UNITED STATES PATENT OFFICE.

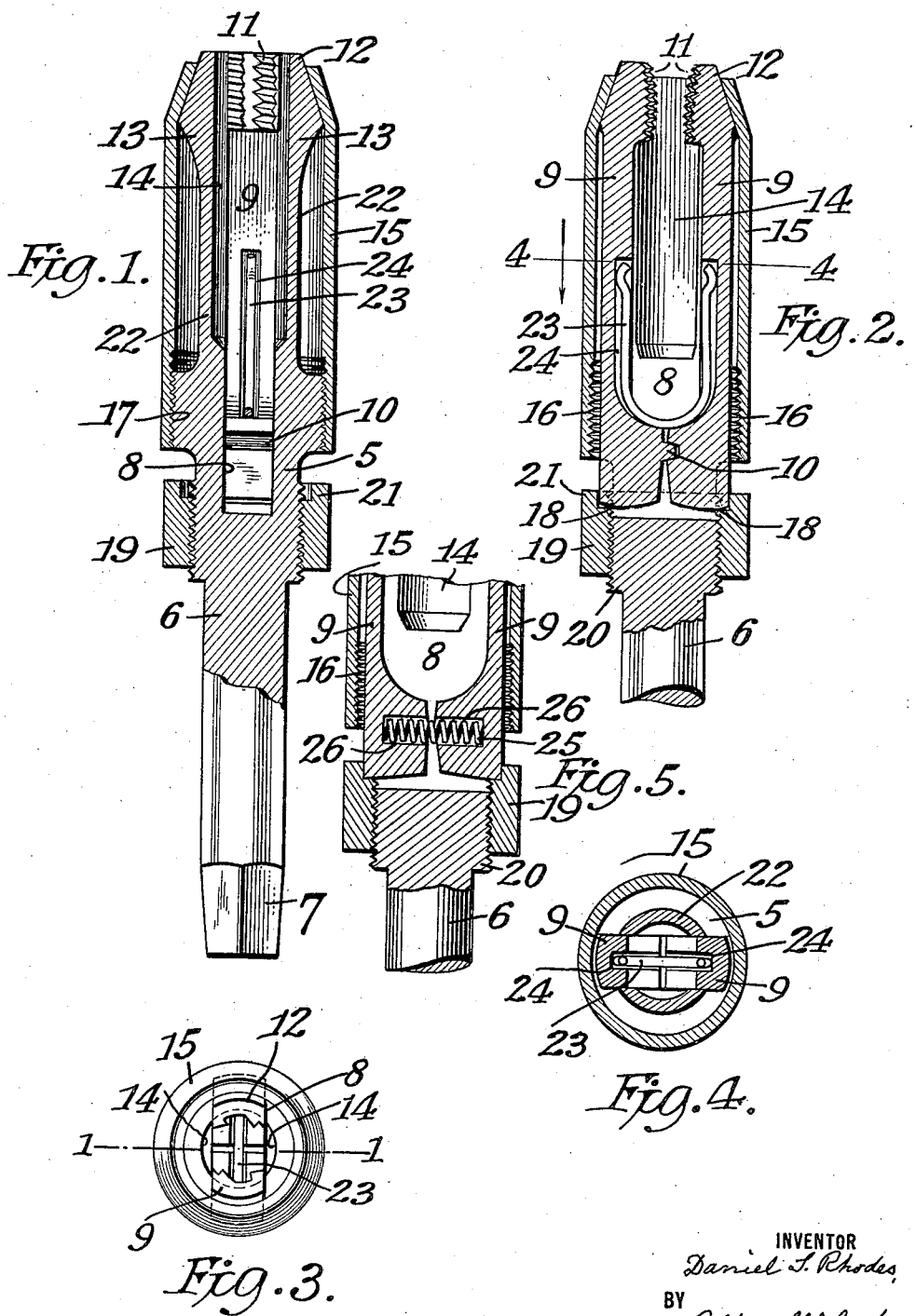

DANIEL S. RHODES, OF GLOVERSVILLE, NEW YORK.

RETHREADING-TOOL.

1,392,705.  Specification of Letters Patent.  Patented Oct. 4, 1921.

Application filed October 25, 1920. Serial No. 419,166.

*To all whom it may concern:*

Be it known that I, DANIEL S. RHODES, a citizen of the United States, and a resident of Gloversville, county of Fulton, State of New York, have invented new and useful Improvements in Rethreading-Tools, of which the following is a specification.

In repairing and refitting machines of various kinds difficulty is often experienced in replacing nuts on bolts and studs whose threads have become badly bruised or otherwise marred. When such conditions occur in practically inaccessible places ordinary hand tools cannot with facility be used to remedy the trouble.

The aim of this invention is to provide a simple and effective rethreading tool or instrument by which bolts and studs having their threads bruised or marred, generally at or near their ends, may be readily restored to freely receive the clamping nuts. The invention therefore involves means having die jaws with internal screw thread cutting or shaping teeth, adapted to be spread apart and placed over marred bolts or studs and then be closed thereon to reshape the threads as the tool is backed off the bolts or studs.

To effectually accomplish this result the shaping threads will have their cutting edges formed to act reversely to the cutting edges of a right hand thread cutting die. Means are provided for adjusting the jaws, and the invention also includes means for firmly clamping the jaws in set position when adjusted to adequately reshape the threads.

An embodiment of the invention is illustrated in the accompanying drawings, forming part of this specification, to which reference will now be had, and in which:

Figure 1, is a longitudinal sectional view of the rethreading tool on line 1, 1, Fig. 3.

Fig. 2, is also a longitudinal sectional view taken at right angle to Fig. 1.

Fig. 3, is an end view of the tool.

Fig. 4, is a transverse section taken on line 4, 4, Fig. 2.

Fig. 5, shows a modified jaw spreading spring.

The rethreading tool of this invention, in its preferred form, is in appearance and in some features of construction similar to the bit holder of an ordinary brace; it consists of a body or central portion 5, having a shank or stem 6, with a squared end 7, to which a wrench or other suitable means may be applied to operate the tool. Extending through the greater part of the body 5 is a slot 8, in which are located a pair of jaws 9, formed at their inner parts with a connection 10, consisting of a tooth or projection on the inner edge at the lower end of one of them seated in a recess in the adjacent edge of the other, to cause them to maintain longitudinal relation to one another, and at their outer ends internal screw thread cutting teeth 11 and external conical surfaces 12, corresponding to conical surfaces on the outer ends of the two branches 13 of the bifurcated portion of the body 5. The inner faces of the branches 13 have cylindrical recesses 14, forming an opening or space between them of a size to freely pass over the largest bolt or stud the tool is designed to operate on.

Surrounding the branches 13 of the body 5 is a sleeve 15, whose outer end is internally conically formed to coact with or act on the external conical surfaces 12 of the jaws 9 and on the similar surfaces of the branches 13; the inner end of the sleeve has a screw thread 16 to fit on screw threads 17 formed on the outer sides of the branches, by which the sleeve is controlled to act on the ends of the branches 13, for the purpose hereafter described, and to hold the sleeve in set position for the conical ends of the jaws to act on the counter conical end of the sleeve when said jaws are moved longitudinally in the diametrical groove of the body.

The jaws 9 are moved outwardly, to close their screw cutting teeth on to the thread to be recut, by their lower ends 18 bearing against a sleeve nut 19, fitted to work on the enlarged threaded portion 20 of the stem 6; the said nut being adequately recessed for its wall or flange 21 to hold the lower ends of the jaws in proper working positions, and as the jaws rock on or have their centers of motion at their lower ends, when adjusted by the nut 19 to cause their outer ends to move toward one another, the cutting teeth are preferably formed on curved lines, lengthwise the tool, to compensate for their departure from axial parallelism and so insure more perfect action of the teeth on the threads of bolts and studs.

The branches 13, back of their conical ends, are cut away or reduced in thickness, as at 22, sufficiently to permit them to be pressed against the sides of the jaws to rigidly clamp them in the slot 8 when in cutting action.

Means are provided for spreading the jaws apart to hold their outer ends against the conical end of the sleeve 15. This may consist of a U-shaped wire spring 23, seated in opposed grooves 24 in the inner faces of the jaws. A spiral spring may be used for this purpose, as shown in Fig. 5. In this case a spiral spring 25 is located in opposed holes 26 in the jaws a short distance above their lower ends upon which the adjusting nut 19 acts. This spring 25, by reason of its operative position, will be quite stiff or strong, it may be made to fairly snugly fill the holes 26 and so then have the function of the connection 10, shown in the other views of the drawings, of locking the cutting teeth longitudinally together in proper related position.

Bolts and studs requiring rethreading will often be in close quarters, and to make the tool available for this work it is essential that the sleeve 15, which determines the size of the tool, be of small diameter, as shown in the drawings, its length being such that it may be manipulated by its inner end, to firmly clamp the jaws, when the tool has been placed over the bolt or stud, with the jaws open, and after the jaws have been set by the nut 19, to properly act on the bolt or stud during the retrograde movement of the tool.

It will be understood that interchangeable jaws adapted to recut threads on different size bolts and studs will be provided; that the principal cutting edges of the teeth 11 are arranged to act anti-clockwise or in the reverse direction to those of the ordinary screw cutting dies, as the preferred proposed method of operation is to rethread bolts and studs during retrograde movements of the tool; that the sleeve 15 and nut 19 will be adequately knurled to afford necessary gripping surfaces and that when the jaws are correctly adjusted they may be rigidly held in the body of the tool by turning the sleeve 15 to cause the branches 13 to press against the jaws.

I claim:

1. A rethreading tool, comprising an elongated body portion substantially cylindrical, jaws fitted to move radially in the body, screw thread cutting teeth internally formed at the outer ends of the jaws and having their cutting edges formed to act under an anti-clockwise or left hand rotation of the tool, an elongated sleeve surrounding the body and jaws, means for holding the jaws normally open to pass freely over the bolt or nut and means operative at the inner end of the tool for closing the jaws on the bolt or stud after the tool has been set in working position.

2. A rethreading tool, comprising a body portion substantially cylindrical and having a diametrical slot, jaws fitted to slide longitudinally in the slot, screw thread cutting teeth internally formed at the outer ends of the jaws, a tooth on the inner edge at the lower end of one of the jaws seated in a recess in the adjacent edge of the other jaw to cause them to move lengthwise together and maintain their cutting teeth in proper related position, means acting on the inner ends of the jaws for moving them lengthwise in the slot, a spring adapted to spread the outer ends of the jaws apart and means for setting the outer ends of the jaws radially inwardly.

3. A rethreading tool, comprising a body portion substantially cylindrical and bifurcated by a diametrical slot, jaws fitted to slide longitudinally in the slot, screw thread cutting teeth internally formed at the outer ends of the jaws, means for moving the jaws lengthwise in the slot, means for setting the outer ends of the jaws carrying the thread cutting teeth radially inwardly and means for pressing the branches of the bifurcated body against the sides of the jaws to rigidly hold their cutting teeth in set position.

4. A rethreading tool, comprising a body portion substantially cylindrical and having a diametrical slot, jaws fitted to slide longitudinally in the slot and provided at their outer ends with internal screw thread cutting teeth and external conical surfaces, an elongated cylindrical sleeve surrounding the body and jaws and having at its outer end an internal conical surface adapted to coact with the conical surfaces of the jaws, a spring for holding the outer ends of the jaws against the sleeve and an adjusting nut on the stem or reduced portion at the inner end of the body acting against the inner ends of the jaws.

5. A rethreading tool, comprising a body portion, jaws fitted to slide longitudinally in the body and provided at their outer ends with internal screw thread cutting teeth formed longitudinally the tool on curved lines, whereby they properly perform their cutting functions at different distances from the axis of the tool, means for moving the teeth toward the axis of the tool when the jaws are longitudinally moved and means controlling the inner ends of the jaws, whereby the jaws are caused to rock on their inner ends when longitudinally moved by said means.

6. A rethreading tool, comprising a body portion substantially cylindrical and bifurcated by a diametrical slot and having outer conical ends on the branches of the bifurcation, a sleeve adjustably held on the body and having an internal conical surface adapted to act on the conical ends of said branches, jaws fitted to slide longitudinally in the slot and provided at their ends with internal screw thread cutting teeth and external conical surface for coaction with the internal conical surfaces of the sleeve and means acting on the inner ends of the jaws to move them outwardly in the slot and thereby cause the cutting teeth of the jaws to approach one another.

7. A rethreading tool, comprising a body portion bifurcated by a diametrical slot and having outer conical surfaces at the ends of the branches of the bifurcation, a sleeve adjustably held on the body and having an internal conical surface adapted to act on the conical ends of said branches, jaws fitted to slide longitudinally in the slot and provided at their outer ends with internal screw thread cutting teeth and external conical surfaces adapted to coact with the internal conical surface of the sleeve, an adjustable nut on the stem or reduced portion of the body and having a recess formed in its end for the reception of the inner ends of the jaws and a spring acting against the insides of the jaws to spread their outer ends apart and to maintain contact between the conical portions of the jaws and the sleeve.

Signed at Gloversville, county of Fulton, State of New York, this 15 day of October, 1920.

DANIEL S. RHODES.

In the presence of—
MARY F. ARGERSINGER,
ESTHER M. MASON.